UNITED STATES PATENT OFFICE.

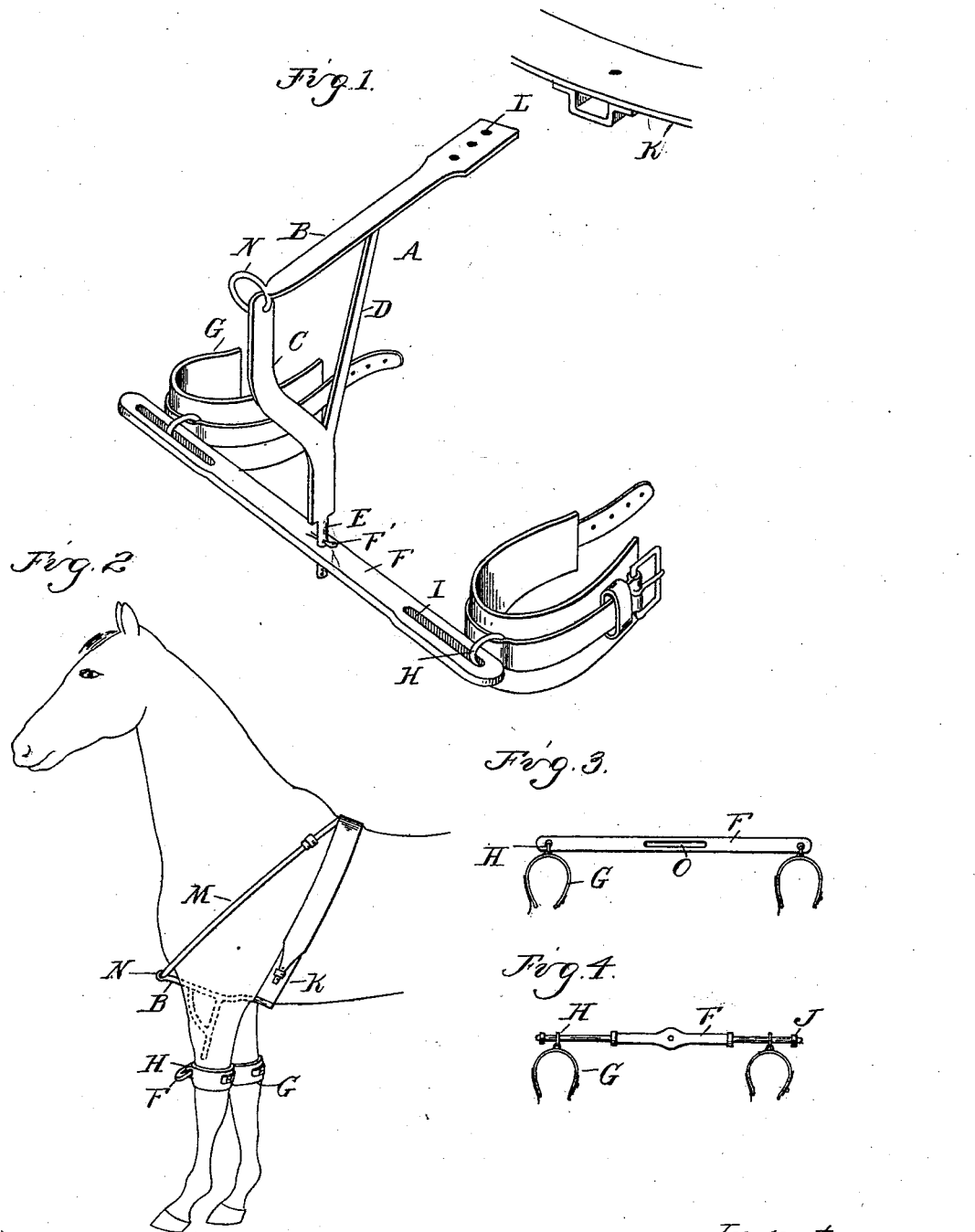

GUSTAVUS BARTON, OF MEMPHIS, MICHIGAN.

HOPPLE.

SPECIFICATION forming part of Letters Patent No. 539,603, dated May 21, 1895.

Application filed February 20, 1895. Serial No. 539,072. (No model.)

*To all whom it may concern:*

Be it known that I, GUSTAVUS BARTON, a citizen of the United States, residing at Memphis, in the county of Macomb and State of Michigan, have invented certain new and useful Improvements in Hopples, of which the following is a specification, reference being had therein to the accompanying drawings.

The invention consists in the construction of a hopple for the fore legs of an animal such as a horse and comprises a cross bar, a bracket secured under the breast of the horse to which said bar is pivoted, straps secured to the animal's fore legs above the knee, with a sliding connection between the cross bar and its supports, so as to permit the animal to move one foot forward at a time, as in walking, but prevent the moving of both feet together as necessary in running or jumping.

The invention further consists in the construction, arrangement and combination of the parts, all as more fully hereinafter described.

In the drawings, Figure 1 is a perspective view of my device detached without the harness. Fig. 2 shows it as applied on a horse as in use. Figs. 3 and 4 are plan views of cross-bars of slightly-modified forms from that shown in Figs. 1 and 2.

A represents a bracket, composed of the breast plate B, the depending post C, at the end, and the brace D. At the lower end of this post is a pin or bolt E on which is centrally pivoted the cross bar F, supported against vertical displacement by the pins F'.

G are straps having suitable securing billets, for attaching them to the front legs of the animal above the knee, and having loops H, in the front to effect a sliding engagement with the cross bar, either by engaging the slots I, (Fig. 1) in the bar, or engaging between the collars J, over the bar, as shown in Fig. 4.

K is a surcingle, adjustably connected with the rear end of the breast plate, in any one of the apertures L, and supports the rear end of the breast plate, while breast straps M passing from the ring N at the front end of the breast plate, are secured to the top of the surcingle and support the forward end thereof.

The parts being thus constructed they are intended to operate as follows: The bracket is supported in position by the girth and breast straps M, as shown in Fig. 2. The leg straps G are then secured to the fore legs of the horse above the knee and the device is ready for use. It is evident that the horse can move either foot forward at a time and such movement will cause the cross-bar F to turn about its central pivot, the rings or loops H sliding in the slots I so as in nowise to interfere with the ordinary walking movements of the horse, but, if the horse attempts to run, in which movement both feet must move together, the cross-bar will act as a stop to prevent it, and will act in the same way to prevent jumping, the upward thrust of his legs in such motion being transmitted to the breast plate.

By arranging a series of apertures for the pins F' in the pin or bolt E I can adjust my device to any desired height, and by arranging a series of apertures for the surcingle can adjust it forward or back for horses of different size.

In the construction shown in Fig. 3, I have shown the loops or rings H simply pivoted to the ends of the cross-bar while for the pin E I provide a slot O to effect a sliding movement of the bar in the walking of the horse instead of the sliding movement of the rings on the bar, and with this construction I get the same effect as that shown in Fig. 1.

What I claim as my invention is—

1. In a hopple, the combination with a breast plate, of a depending bracket thereon, leg straps, a pivotal laterally swinging bar connecting the forward portions of the straps and the lower end of the bracket, and means for securing the breast plate in place, substantially as described.

2. In a hopple for animals, the combination of a breast plate, a harness for securing the plate under the horse's breast between his fore legs, a post depending from the plate, a laterally swinging cross bar centrally pivoted to the post, straps adapted to be secured to the fore legs above the knees, and a sliding connection between the straps and the cross-bar arranged in advance of the straps, substantially as described.

3. In a hopple, the combination of the breast plate B, a surcingle adapted to be secured to the rear end thereof, the breast straps M secured to the front end thereof and connected to the surcingle, the post depending from the front of the breast plate, a pin at the lower end of the post, a laterally swinging cross bar adjustably pivoted on the pin having longitudinal slots in its end, straps adapted to be secured to the horse's fore legs above the knee and rings on the straps engaging in the slots in the cross bar, substantially as described.

In testimony whereof I affix my signature in presence of two witnesses.

GUSTAVUS BARTON.

Witnesses:
WM. F. HARRINGTON,
HENRY MCGUIRE.